United States Patent
Parameswaran et al.

(10) Patent No.: US 12,283,116 B1
(45) Date of Patent: Apr. 22, 2025

(54) VEHICLE SIGNATURE CAPTURE APPARATUS AND SYSTEM FOR ENTRY, OCCUPANCY, EXIT, AND SECURITY

(71) Applicant: EAGLE EYE NETWORKS, INC., Austin, TX (US)

(72) Inventors: Sankaranarayanan Parameswaran, Bengaluru (IN); Ranjith Parakkal, Bengaluru (IN); Dossan George, Bengaluru (IN); Bhaskar C, Bengaluru (IN); Deval Shah, Bengaluru (IN); Naman Mishra, Bengaluru (IN)

(73) Assignee: Eagle Eye Networks, Inc., Austin, TX (US)

( * ) Notice: Subject to any disclaimer, the term of this patent is extended or adjusted under 35 U.S.C. 154(b) by 404 days.

(21) Appl. No.: 17/539,199

(22) Filed: Dec. 1, 2021

Related U.S. Application Data (63) Continuation-in-part of application No. 17/511,554, filed on Oct. 27, 2021.

(51) Int. Cl.
  *G06V 20/62* (2022.01)
  *G06F 16/27* (2019.01)
  *G06V 10/147* (2022.01)
  *G06V 10/74* (2022.01)
  *G06V 10/776* (2022.01)
  *G06V 20/52* (2022.01)
  *H04N 7/18* (2006.01)
  *H04N 23/90* (2023.01)

(52) U.S. Cl.
  CPC ............ *G06V 20/625* (2022.01); *G06F 16/27* (2019.01); *G06V 10/147* (2022.01); *G06V 10/74* (2022.01); *G06V 10/776* (2022.01); *G06V 20/52* (2022.01); *H04N 7/181* (2013.01); *H04N 23/90* (2023.01)

(58) Field of Classification Search
  None
  See application file for complete search history.

(56) References Cited

U.S. PATENT DOCUMENTS

2020/0219390 A1 * 7/2020 Lyles ................ G07B 15/02

FOREIGN PATENT DOCUMENTS

CN      108460847 A  * 8/2018    ......... G06K 9/00825

* cited by examiner

*Primary Examiner* — James M Anderson, II (57) ABSTRACT

This invention identifies vehicles on arrival, and matches exiting vehicles to their corresponding entry event. The system uses at least one camera to capture not only the vehicle license plate but also the visual features. A "signature" formed out of the optical features of the vehicle is compared against the pre-generated signatures of vehicles in a whitelist. The "signature" for each exiting vehicle is compared against all signatures of vehicles that entered the garage. A plurality of filters reduce the possible matching candidates based on factors like license plate based edit distance, location information of vehicle owner. Synchronizing a database in each local processing unit (LPU) with a central database enables signature from images from sites that have good license plate reads, to assist in authentication in other sites where the reads are lower quality. Spatial diversity in cameras and/or illuminators enable hologram and 3D Printing detection and decoding.

4 Claims, 7 Drawing Sheets

VEHICLE SIGNATURE CAPTURE APPARATUS AND SYSTEM FOR ENTRY, OCCUPANCY, EXIT, AND SECURITY

CROSS-REFERENCE TO RELATED APPLICATIONS

This non-provisional application is a Continuation-In-Part application Ser. No. 17/511,544 and benefits from its priority date of Oct. 27, 2021.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISK OR AS A TEXT FILE VIA THE OFFICE ELECTRONIC FILING SYSTEM (EFS-WEB)

Not Applicable.

STATEMENT REGARDING PRIOR DISCLOSURES BY THE INVENTOR OR A JOINT INVENTOR

Not Applicable.

BACKGROUND OF THE INVENTION

Technical Field

The disclosure relates to a system and method of training a machine learning module of an edge device for image processing and verification. In particular, the present invention relates to a system and apparatus for performing vehicle identification for authentication, followed by automated occupancy and congestion processing processes.

Background of the Invention

A variety of concerns, including health and speed of operation necessitate seamless touch-free authentication of vehicles into and out of private or public areas of restricted use. A variety of methods have been used in this regard, each with their own benefits and drawbacks. Some methods like License Plate Recognition (or LPR) involve the usage of Sensors and Imaging. This method satisfies constraints of quick response rate, however there are obvious drawbacks resulting from issues ranging from occlusion (e.g. cycle stand fitted on car) to readability of the plates. Other methods like QR Code Scanning are also popular. Such methods enjoy high accuracy but suffer from slow response.

Another important consideration in private or public streets is the ability to operate even without the necessity of "gates" or boom-barriers. This system would make for seamless entry using only secondary methods of interaction to intimate the users about usage fees or tolls. A robust, highly accurate visual system is needed in such cases for the following:

1. Detection and Identification of vehicles in both entry and exit
2. Mapping the vehicle to a white-list on entry even if the vehicle has obstructions or occlusions to the license plate, or damaged license plate.
3. Using secondary mode of authentication to further improve/cross-verify the visual mode of authentication.

Further, Vehicle Identification systems (that use complete visual features of a vehicle rather than just license-plate reading) have received attention in the past. While they add a degree of robustness to merely using the license plate information, there are newer challenges introduced to the problem. The image thus captured may have variability due to capturing device, lighting and inexperience of the user in taking such images.

The above problems have motivated the present invention.

Thus, it can be appreciated that a long sought solution is needed for improved identification of vehicles when License Plates are partially illegible and enabling vehicle access and security surveillance. Furthermore, what is needed is a way to share information among a plurality of vehicle recordation sites which have variation in quality of image capture or data communication.

Heretofore, no known system or methods have addressed the question of performing machine learning and image processing in low performance edge devices with limited or no Internet connectivity. No known system or methods have addressed the question of identifying vehicles when license plate character recognition is inconclusive or unavailable.

SUMMARY OF INVENTION

This invention includes methods to a. Identify vehicles on arrival, b. Match existing vehicles to their corresponding entry event, and c. Conduct an inventory of vehicles which are within a boundary for a range of time.

The identification and matching process are done using purely visual inputs (cameras). In an embodiment, additional cues, for e.g. location information from mobile application present in vehicle owners phone augment the process. The system uses at least one camera to capture not only the vehicle license plate but also the visual features. The features can be captured from both rear and front of the vehicle. At entry, the set of images from all cameras, together with the License plate are used to identify the vehicle from one of several white-listed vehicles (e.g. monthly parkers). A "signature" formed out of the visual features of the vehicle is compared against the pre-generated signatures of vehicles in the whitelist, and the best match is identified. Similarly at exit, the "signature" for the vehicle is compared against all signatures of vehicles that entered the garage. The invention deploys a plurality of filters to reduce the possible matching candidates based on factors like License plate based edit distance (of current vehicle and potential candidates), Location information of vehicle owner (if available), amongst other cues. The invention auto-onboards the signature of whitelisted vehicles. Sometimes the vehicle license plate is read correctly with very high confidence. Such occasions are used to obtain the vehicle image for signature computation and storage in the database. This is then used to assist during other occasions when the vehicle license plate is not read correctly. The database in each local processing unit (LPU) is synchronized with a central database so signature from images from sites that have good license plate reads, can be used to assist in authentication of same vehicle in other sites where the reads are not as good.

The system includes at least one camera, a local processing unit, a cloud processing unit, and a plurality of vehicle signature database services. The system includes cameras having a compute unit, or sending data to a separate local processing unit (LPU). Optimally, one camera oriented at the rear of a vehicle performs LPR and also obtains the vehicle features. Visual authentication solves the surveillance security problems of both gated communities and congestion pricing of public roadways.

To overcome limited effectiveness of license plate usage, Visual features of vehicle (Vehicle Signature) picks up many other distinctive characteristics in addition to license plate. To distinguish among vehicles having similar visual features and no other salient features, the invention explores and limits the search space to match or authenticate vehicles by using other methods to time-wise restrict the list of candidates which occupy or transit. Another unique sub-signature is based on the edit distance between plates, and a signature of character positions within the License Plate. A semi-automated approach onboards the details of whitelisted vehicles.

The system includes one or more cameras, each camera either having a compute unit either in the camera unit, or sending data to a separate local processing unit (LPU). In one embodiment, there can be just one camera looking at the rear of a vehicle performing LPR and also obtaining the vehicle features. In another embodiment, there can be two cameras, one looking at the rear of the vehicle and another looking at the front of the vehicle. In yet another embodiment, there can be more than 2 cameras, looking at the front, rear and sides of the vehicle. As mentioned in the problem statement, visual authentication is to be the primary mode of authentication since the system intends to solve the problem of both gated and gateless garages. While it can be appreciated by those skilled in the art that License Plate serves to be a key visual authenticator for vehicles, there are plenty of statistical challenges that limit 100% effectiveness of license plate usage, for example, broken plates, imperfect imaging due to lighting conditions, temporary plates, obstructions over license plates like cycle rack to name a few. Hence, in embodiments of the below invention other visual features of vehicle (termed henceforth in the document as Vehicle Signature) are included in addition to using the license plate. This picks up many other distinctive features of the vehicle in addition to license plate. Even using vehicle signature is prone to errors, especially amongst vehicles having similar visual features and no other salient features. In another aspect this invention, the search space to match or authenticate vehicles is reduced using other methods. In one embodiment, location information (e.g. GPS) is used to time-wise restrict the list of candidates who may have entered or exited. In another embodiment, a unique sub-signature based on License Plate is used, for example the edit distance between plates, or a signature of character positions within the License Plate.

Finally, the invention provides an effective method for onboarding the details of whitelisted vehicles. This invention avoids the need to have onboarding done through user involvement and auto-onboards users using a semi-automated approach.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments may provide for: low cost and low performance edge apparatus with low connectivity performing narrow image processing tasks by machine learning. These and other features and advantages of the present invention will become apparent from the following detailed description of illustrative embodiments thereof, which is to be read in connection with the accompanying drawings.

BRIEF DESCRIPTION OF THE SEVERAL VIEWS OF THE DRAWINGS

The foregoing and other objects, aspects, features, and advantages of the disclosure will become more apparent and better understood by referring to the following description taken in conjunction with the accompanying drawings, in which reference will be made to embodiments of the invention, example of which may be illustrated in the accompanying figure(s). These figure(s) are intended to be illustrative, not limiting. Although the invention is generally described in the context of these embodiments, it should be understood that it is not intended to limit the scope of the invention to these particular embodiments. Preferred embodiments of the present invention will be described below in more detail, with reference to the accompanying drawings.

| Table of references | | | |
|---|---|---|---|
| Unit/Component/Method/step | ref | Figure | Claim |
| | | 7 | |
| Local Processing Unit (LPU) | 4103 | | |
| stream of video frames from Cameras | 4101 4102 | | |
| Cloud Processing Unit (CdPU) | 4105 | | |
| Manual Review Process | 7040 | | |
| User Notification Step | 7021 | | |
| User Dispute step | 7031 | | |
| Garage Occupancy with Reconciliation Information | 7032 | | |
| | | 6 | |
| Cloud Processing Unit (CdPU) | 4105 | | |
| User Facing Application | 4106 | | |
| Cloud Signature Database Service | 4107 | | |
| Second Matcher component | 6304 | | |
| Second Signature component | 6303 | | |
| Second Image Selector component | 6302 | | |
| Image Validator | 6306 | | |
| Second Candidate Selector component | 6305 | | |
| User location information | 4104 | | |
| Output from Local Processing Unit | 4109 | | |
| | | 5 | |
| Local Processing Unit (LPU) | 4103 | | |
| A Local Signature Database Service | 4108 | | |
| Stream of video frame images from Main Camera | 4101 | | |
| Stream of video frame images from Main Camera | 4102 | | |
| A first Image Selector component | 5202 | | |
| License Plate Reader (LPR) component | 5201 | | |
| A first Candidate Selector component | 5205 | | |
| A first Signature component | 5203 | | |
| A first Matcher component | 5204 | | |
| | | 4 | |
| System of invention | 4000 | | |
| stream of video frames from a Main Camera | 4101 | | |
| stream of video frames from an Aux Camera | 4102 | | |
| Local Processing Unit (LPU) | 4103 | | |
| User Location Information | 4104 | | |
| Cloud Processing Unit (CdPU) | 4105 | | |
| User Facing Application | 4106 | | |
| Cloud Signature Database Service (DSDBS) | 4107 | | |
| Local Signature Database Service (LSDBS) | 4108 | | |
| Output of LPU | 4109 | | |
| | | 3 | |
| Method | 3600 | | |
| | | 2 | |
| Method | 2500 | | |
| | | 1 | |
| | | computersys | |

DETAILED DESCRIPTION

This invention identifies vehicles on approach, and matches exiting vehicles to their corresponding entry event. The matching process uses primarily optical inputs. The system uses at least one camera to capture not only the vehicle license plate but also the visual features. A "signature" formed out of the optical features of the vehicle is compared against the pre-generated signatures of vehicles in a whitelist, and the best match is identified. The "signature" for each exiting vehicle is compared against all signatures of vehicles that entered the garage. A plurality of filters reduce the possible matching candidates based on factors like license plate based edit distance, location information of vehicle owner. Synchronizing a database in each local processing unit (LPU) with a central database enables signature from images from sites that have good license plate reads, to assist in authentication in other sites where the reads are lower quality.

General methods to authenticate vehicles entering a community or neighborhood comprises one or more manual or electronic methods (manual entry, RFID, QR Code, License Plate). These have issues with setting up of infrastructure (barrier/gate), speed of execution, or being error prone. Accordingly, to solve this problem, this invention proposes a novel way to a. Identify vehicles on arrival and b. Matching existing vehicles to their corresponding entry event.

The identification and matching process are done using purely visual inputs (cameras) and may be optionally facilitated by usage of additional cues, for e.g. location information from mobile application present in vehicle owners phone.

The system uses one or more cameras to capture not only the vehicle license plate but also the visual features. The features can be captured from both rear and front of the vehicle. At entry, the set of images from all cameras, together with the License plate are used to identify the vehicle from one of several white-listed vehicles (e.g. monthly parkers). To facilitate this process, a "signature" formed out of the visual features of the vehicle is compared against the pre-generated signatures of vehicles in the whitelist, and the best match is identified. Similarly at exit, the "signature" for the vehicle is compared against all signatures of vehicles that entered the garage.

One of the key steps of this invention is to deploy a set of filters to reduce the possible matching candidates based on factors like License plate based edit distance (of current vehicle and potential candidates), Location information of vehicle owner (if available), amongst other cues.

The other key step of this invention is to auto-onboard the signature of whitelisted vehicles. Sometimes the vehicle license plate is read correctly with very high confidence. Such occasions are used to obtain the vehicle image for signature computation and storage in the database. This is then used to assist during other occasions when the vehicle license plate is not read correctly. Further, the database in the local processing unit (LPU) is synchronized with a central database. So signature from images from sites that have good license plate reads, can be used to assist in authentication of same vehicle in other sites where the reads are not good.

Figure 1:
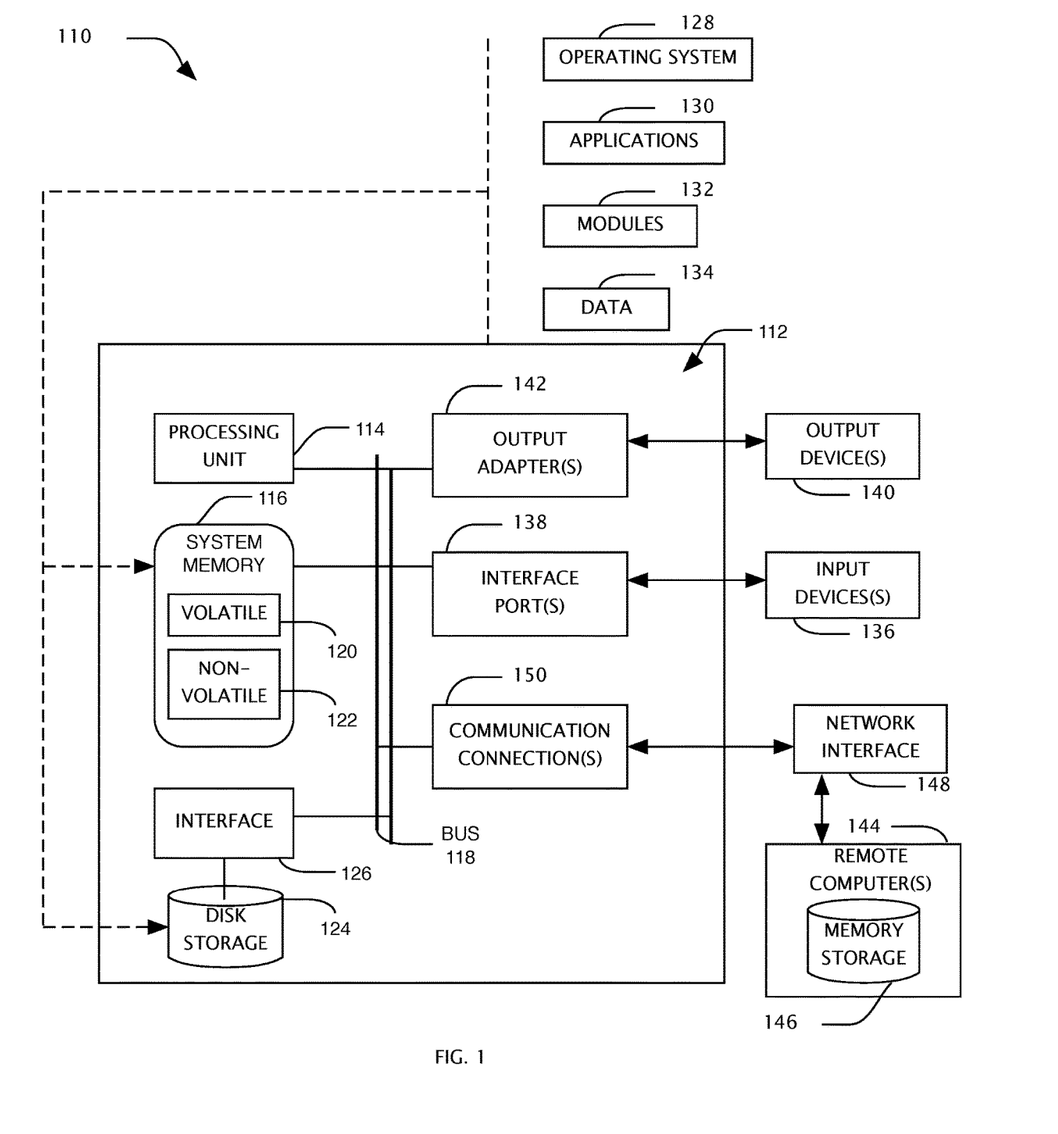
FIG. 1 shows an exemplary computing architecture suitable for performing the methods of the processes of the invention as executable instructions.

An exemplary system and processor architecture illustrated in FIG. 1 is further described below.

Figure 2:
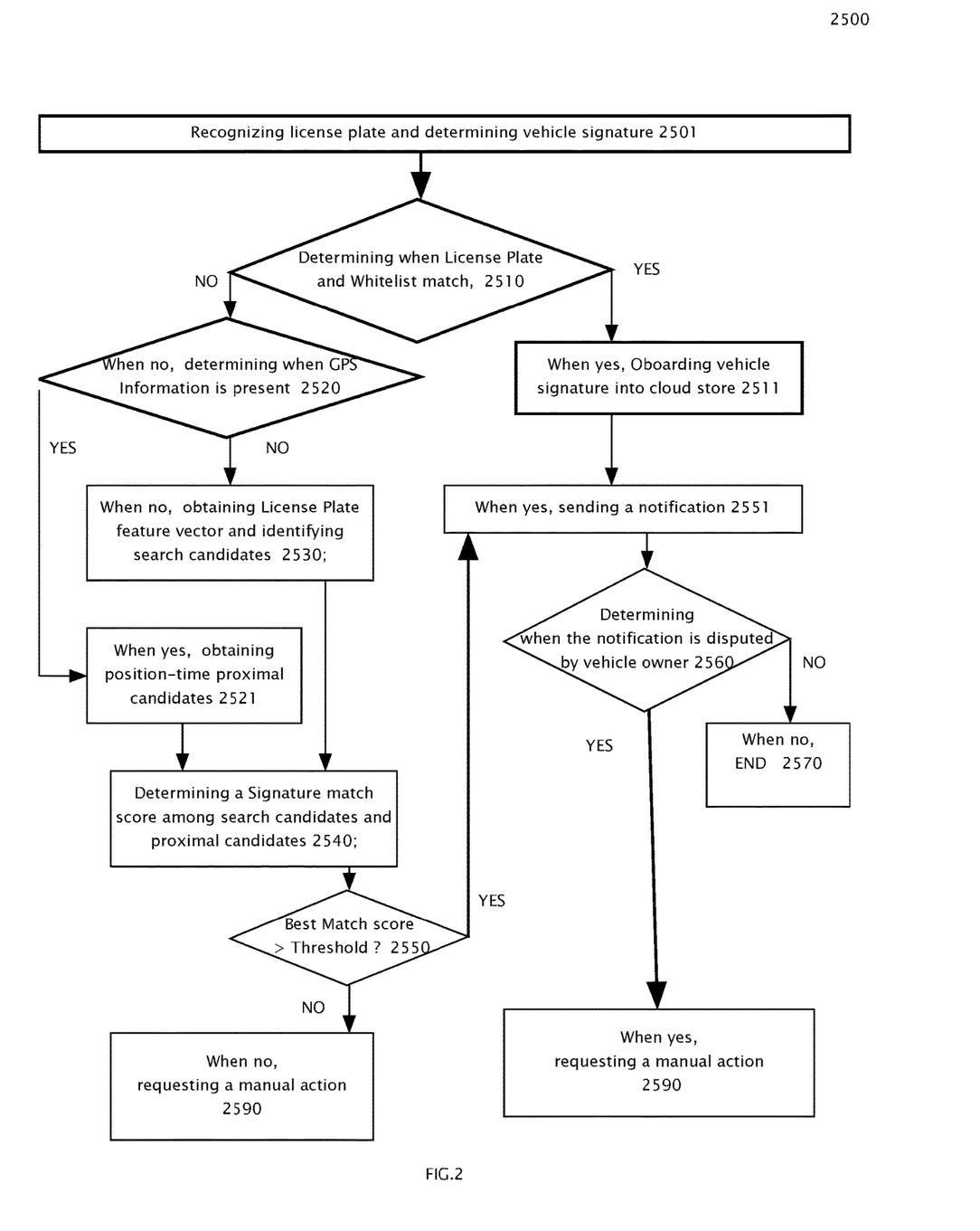
FIG. 2 shows a flow chart of a method embodiment of the invention for a flow in entry into a restricted access area.

Referring to FIG. 2, a method embodiment of the invention 2500 in entering a restricted access area includes the processes:

Recognizing license plate and determining vehicle signature 2501

Determining when License Plate and whitelist match, 2510;

When yes, Onboarding vehicle signature into cloud store 2511; and sending a notification 2551;

When no, determining when location (e.g. GPS) Information is present 2520;

When yes, obtaining position-time proximal candidates 2521;

When no, obtaining License Plate feature vector and identifying search candidates 2530;

Determining a Signature match score among search candidates and proximal candidates 2540;

Determining when Best Match score exceeds a Threshold 2550;

When no, requesting a manual action 2590;

When yes, sending a notification 2551;

Determining when the notification is disputed by vehicle owner 2560;

When no, end 2570;

When yes, requesting a manual action 2590.

Figure 3:
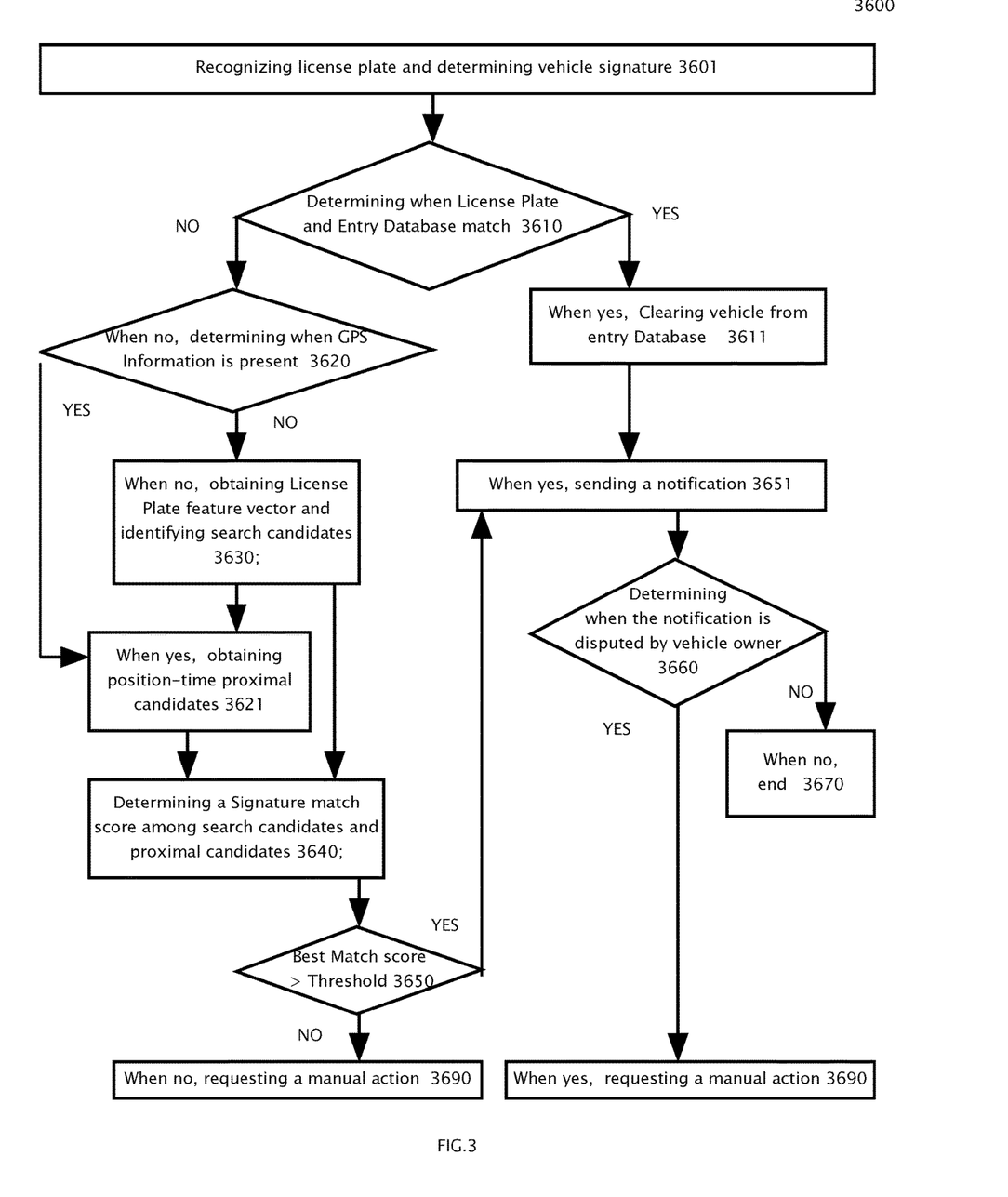
FIG. 3 shows a flow chart of a method embodiment of the invention for a flow in exiting from a restricted access area.

Referring to FIG. 3, a flowchart of a method embodiment of the invention 3600 in exiting a restricted access area application includes the steps:

Recognizing license plate and determining vehicle signature 3601

Determining when License Plate and Entry Database match, 3610;

When yes, Clearing vehicle from entry Database 3611; and sending a notification 3651;

When no, determining when location information e.g. GPS is present 3620;

When yes, obtaining position-time proximal candidates 3621;

When no, obtaining License Plate feature vector and identifying search candidates 3630;

Determining a Signature match score among search candidates and proximal candidates 3640;

Determining when Best Match score exceeds a Threshold 3650;

When no, requesting a manual action 3690;

When yes, sending a notification 3651;

Determining when the notification is disputed by vehicle owner 3660;

When no, end 3670;

When yes, requesting a manual action 3690.

Figure 4:
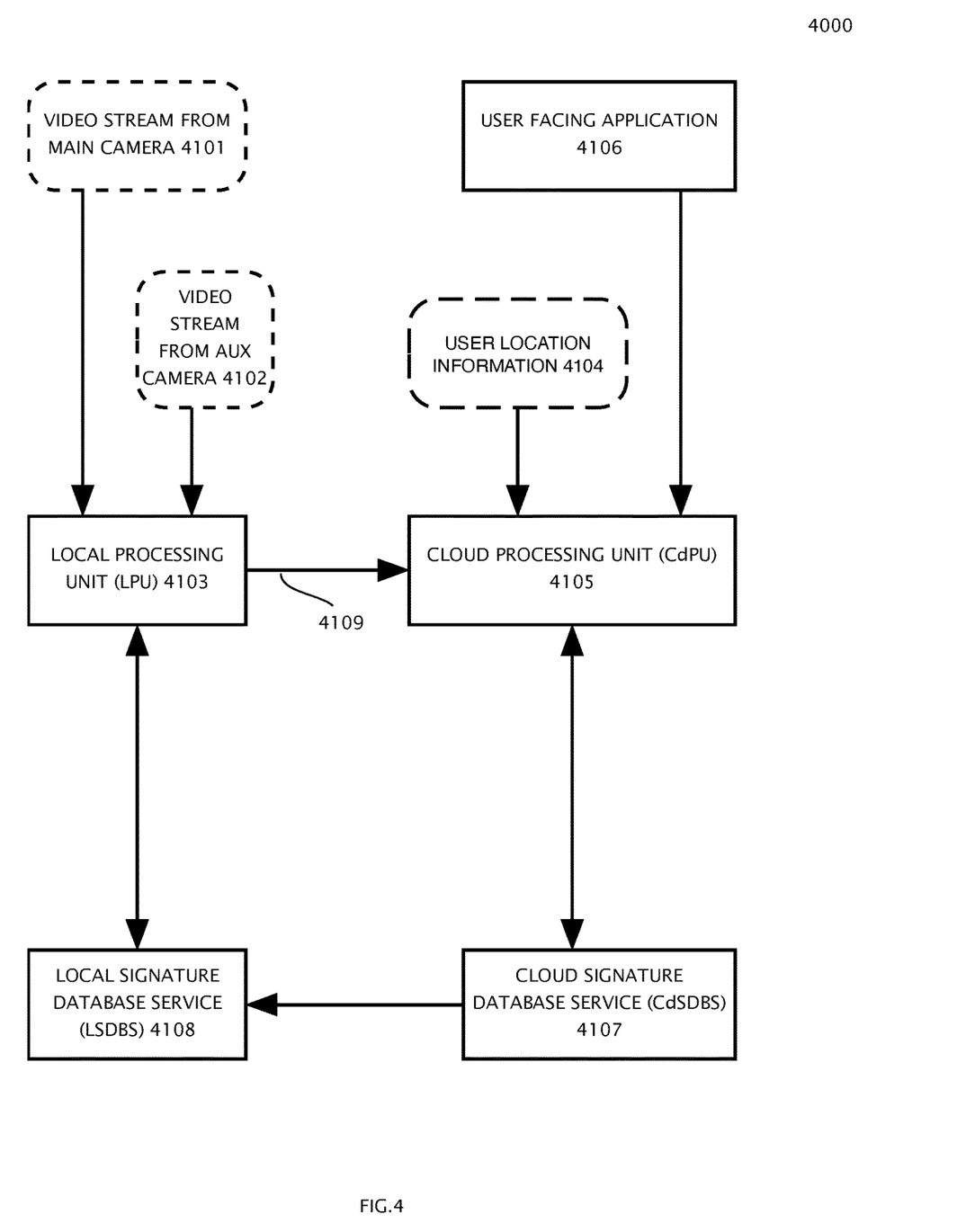
FIG. 4 shows a block diagram of key components of the system architecture.

Referring to FIG. 4, a block diagram of a system embodiment 4000, a Local Processing Unit 4103 performs the LPR (License Plate Reads) and the vehicle signature on the "edge". This is typically at a gateway for a restricted access area and is hence set up to reduce the delay between the entry/exit of the vehicle and physical action to be performed on site. The LPU transmits event information 4109 to the Cloud Processing Unit which event information includes images from main and auxiliary cameras, license plate reads, timestamps, indication of match/mismatch with whitelisted database. It also transmits signature information in case of a successful match with a whitelisted vehicle.

The Cloud Processing Unit 4105 has two fundamental tasks. In the event of an event from any LPU (4109) which is already not whitelisted, it evaluates the Vehicle Signature and validates it against onboarded signatures from users if already present. The other task involves evaluation and storage of signature from user onboarded image (4106).

User location information 4104 can be captured from any mobile device that supports obtaining and sharing location information using one or more modalities like GPS, WiFi, Bluetooth etc.

User application 4106 can execute on any computing device associated with the user. It captures vehicle images from the user and sends these to cloud for validation and user onboarding. After the user onboarding, at least one signature for the given user/vehicle is available in the Cloud Database Signature Service.

Cloud Signature Database Service 4107 aggregates Signatures of all vehicles across all sites.

Local Signature Database Service 4108 maintains local copies of all whitelisted vehicle signatures in addition to whitelisted License Plate readings on the edge for fast response on-site.

Local Processing Unit 4103 is described in further detail below and in reference to FIG. 5. It consists of an LPR module (5201), an image selector module (5202), a signature module (5203), a matcher module (5204) and a candidate selector module (5205).

The LPR module (5201) analyzes the sequence of images from the main camera and computes the plate reads for every incoming vehicle. For each incoming vehicle, it sends one event for further processing.

The image selector module (5202) receives the event from 5201, and obtains the best images from auxiliary camera. As the main and auxiliary cameras are different physical units, they may not operate synchronously. It is necessary to obtain the appropriate image from auxiliary cameras for signature evaluation, as opposed to images where vehicle images are only partially visible. The image selector module analyses a plurality of images from each auxiliary camera (separated by time offsets from one another) and determines the best image for signature evaluation.

The signature module 5203 uses the chosen images from the plurality of cameras and evaluates the signature. The signature is separately evaluated for each perspective of vehicle.

The matcher module 5204, is responsible for using the LPR and signature information to uniquely map the vehicle. It receives the list of potential matches from the candidate selector.

The result 4109, (including indicia of match/no match along with the signature and license plate read) is sent to the cloud processing unit. If no matching score above the match threshold is found, the matching module would indicate no-match status in 4109. The candidate selector module performs the important function reducing the list of potential candidates in order to improve the matcher accuracy and reduce false positives. It scores the potential candidates on a plurality of features including license plate reading divergence, distinctive features on license plate, and reduces the search space of matching candidates. The license plate read is picked from both main and auxiliary cameras from selected image. For example, the rear license plate as seen by main camera may be occluded, but the front license plate clearly visible. The distinctive features may include license plate reads, reading confidence, special embeddings on license plates, occlusion etc.

Figure 5:
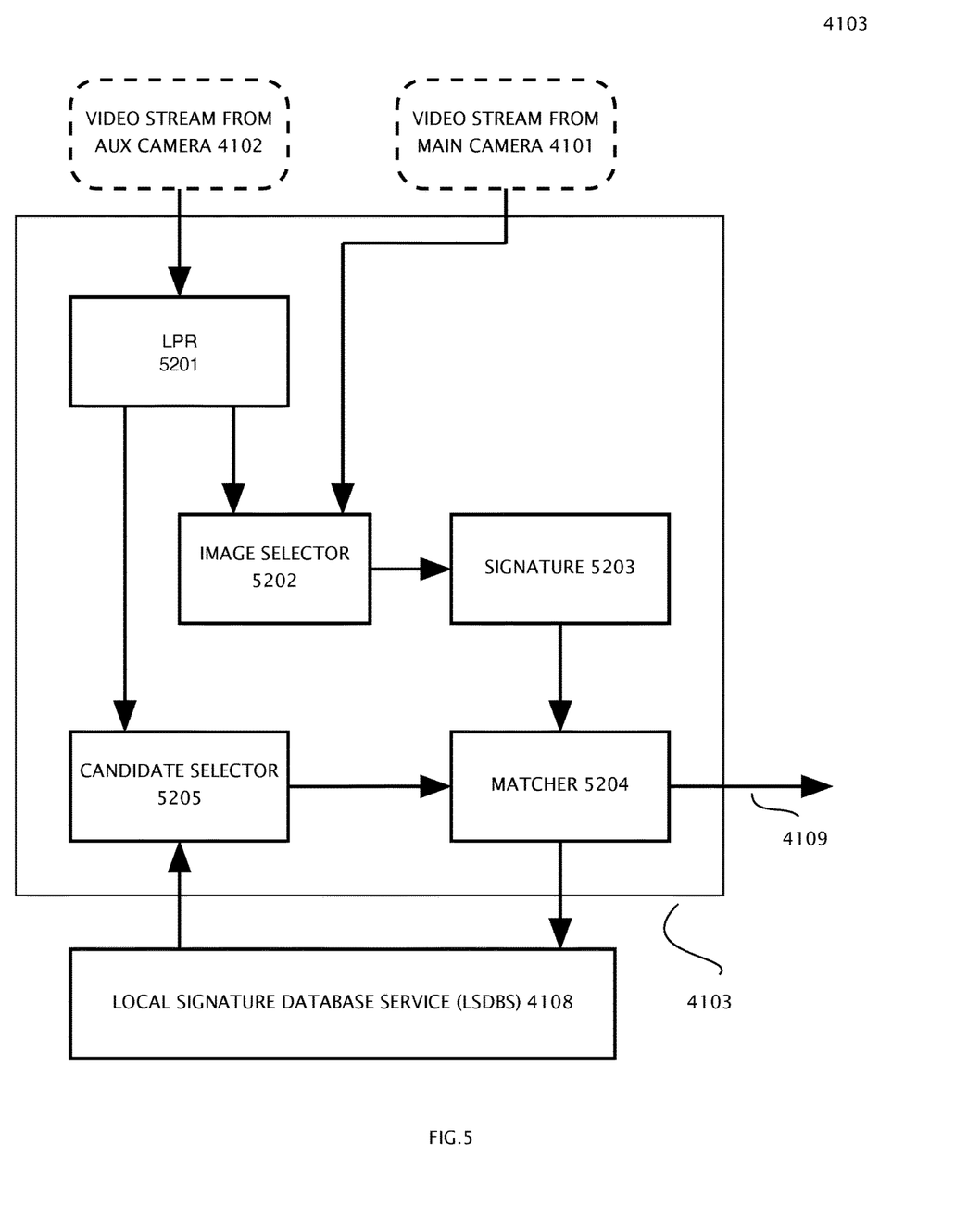
FIG. 5 shows a block diagram of functions of a local processing unit.
Figure 6:
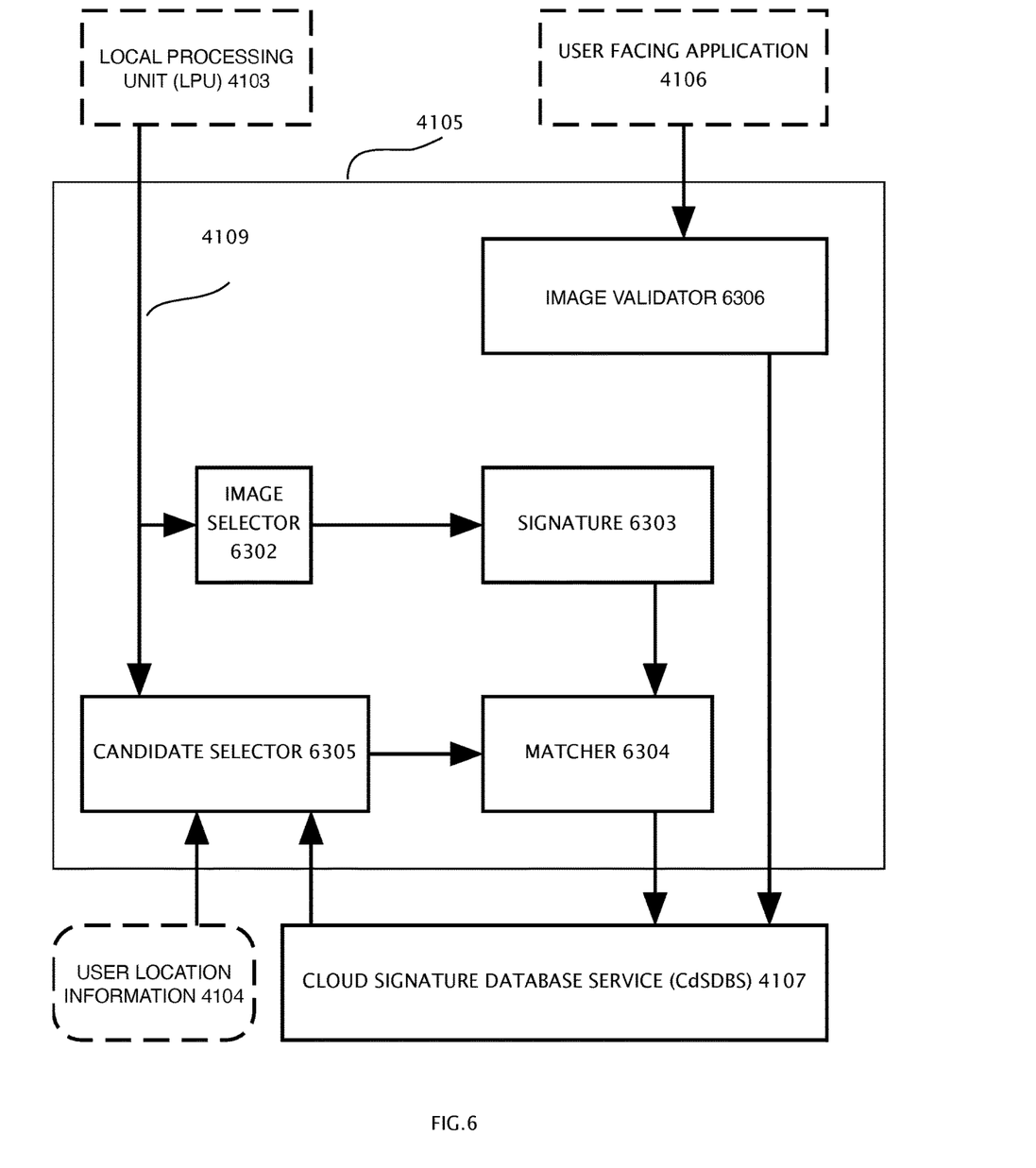
FIG. 6 shows a block diagram of functions of a cloud processing unit.

FIG. 6 depicts the component blocks that make up the Cloud Processing Unit 4105. Components 6302, 6303, 6304 and 6305 are functionally similar to 5202, 5203, 5204, 5205. Component 6305 however operates with an additional input of location information 4104, wherever available, to help reduce the search space of potential matching candidates.

Components 6302, 6303, 6304, 6305 are invoked whenever any component 5202, 5203, 5204, 5205 in the local processing unit does not exist or failed to find a suitable match. They deploy a more generalized version of signature evaluation to support a variety of image quality and perspectives uploaded by the user. Having matched with a white listed user, using the user onboarded image, the updated signature (as evaluated by the edge camera) is updated to the cloud signature database service.

The local signature database service additionally queries the cloud signature database service for any updates to the signature. Only signatures evaluated using images from the edge cameras are updated back to the local signature database service.

Referring to FIG. 4, an exemplary system embodiment 4000 of the invention includes a Cloud Signature Database Service (CdSDBS) 4107 and a Local Signature Database Service (LSDBS) 4108 which receives updates from the Cloud Signature Database Service 4107. Each Signature Database Service is coupled to its respective Processing Unit 4105 4103. In addition to the Local Signature Database Service 4108, the Local Processing Unit 4103 receives a stream of video frames from a Main Camera 4101 and a stream of video frames from an Aux Camera 4102. In addition to the Cloud Signature Database Service 4107, the Cloud Processing Unit 4105 receives User location info 4104, input from a User Facing Application component 4106, and the results of transformations performed in the Local Processing Unit 4103 which are the Vehicle event indicia 4109.

Referring to FIG. 5, a Local Processing Unit (LPU) 4103 is communicatively coupled to an external Local Signature Database Service 4108. The output 4109 of the Local Processing Unit is transmitted to the Cloud Processing Unit 4105. Each Local Processing Unit 4103 receives a stream of video frame images from a Main Camera 4101 and a stream of video frame images from an Aux Camera 4102. The Local Processing Unit includes a first Image Selector 5202 which receives the stream of video frame image from the Main Camera 4101 and the stream of video frame images from the Aux Camera 4102 after it has been transformed by the License Plate Reader (LPR) component 5201. A first Candidate Selector component 5205 also receives the stream of video frame images from the Aux Camera 4102 after it has been transformed by the License Plate Reader (LPR) component 5201 and input from an external Local Signature Database Service 108. A first Signature component 5203 transforms the result of the Image Selector component 5202 and provides the resultant Signature indicia to a first Matcher component 5204 which emits a result 4109 from the Local Processing Unit. The first Matcher component 5204 receives input from the first Candidate Selector 5205 and also provides its result to the external Local Signature Database Service 4108.

The License Plate Reader 5201 transforms the incoming video stream from the main camera 4101 into a time ordered sequence of events xxxx, one event per vehicle. A License Plate Reader includes (but is not limited to) the following components A Decoder which decodes the incoming compressed stream and produces a time ordered sequence of video images xxxx. The incoming stream may be one of several popular formats like H.264, MJPEG, H.265, MPEG4. A Detector which looks for vehicle and license plate in the sequence of images xxxx one image at a time. Specifically it produces information about objects (vehicles and license plate, toll tags, window identity badges, decals, transportation and parking permits, mirror hangtags, dashboard transponders) along with useful metadata relating to the presence, position, or absence of the objects in the image, the size of objects and the confidence of prediction of the object.

An Optical Character Reader which reads the license plate, specifically, it picks metadata information of license plate objects from detector, extracts the pixels from rectangular region in the image corresponding to the same, and performs an Optical Character Recognition on the said region to produce a textual read of the license plate registration.

A tracker which correlates the position of vehicles across the images for the purpose of tracking the vehicle flow and produces an event corresponding to the vehicle yyyy. The event in this scenario is a "software trigger" that consists of information about the vehicle including type of vehicle, the license plate read and other attributes including time of occurrence. It also includes a plurality of supporting evidence images, which are merely intelligently sampled images of the decoder output xxxx. In one embodiment, this can be just one image that produced the biggest and best read for the plate. In another embodiment 3 images are picked, one when the vehicle was first seen, another when the vehicle was last seen and a third image in between the first two.

The image selector 5202 operates on the plurality of images aaaa and the metadata in yyyy as produced by the License Plate Reader 5201. It also picks a plurality of images (bbbb) from the auxiliary camera stream 4102. Note that the auxiliary camera may not necessarily be processed by the License Plate Reader 5201. In this case, the image selector merely picks the plurality of images bbbb from 4102, based on using the same timestamps as of the evidence images in aaaa. The plurality of images aaaa and bbbb represent different time instances and hence different views of the same vehicle. The image selector picks one image from aaaa and bbbb that is best suited for vehicle signature. It works by picking different semantic features of the vehicle (license plate, taillights, wheels) and picks a view that represents the best coverage of the vehicle. Note that an evidence image that best represents the license plate read may not be necessarily the best image for signature, thereby necessitating the work of the image selector.

The signature component 5203 transforms the image(s) produced by the image selector 5202 and produces signature(s). If two images, one from main and one from auxiliary camera are present, a separate signature vector is formed for each. The signature is a compressed descriptor of the vehicle in the form of a vector of numbers, that eliminates redundancy. It is produced by a machine learning algorithm. The signature is intended to be discriminative, in that, the L2 Norm of the signature vector of different images of the same vehicle will be low, and the L2 norm of the signature vectors of different vehicles will be high. As is known to practitioners of machine learning, the L2 norm calculates the distance of the vector coordinate from the origin of the vector space. As such, it is also known as the Euclidean norm as it is calculated as the Euclidean distance from the origin. The result is a positive distance value. Machine Learning often utilizes the terminology and operations of Linear Algebra mathematics.

The signature matcher component 5205 compares the signature of the vehicle with the signatures of the vehicle in the database. The list is provided by the candidate selector 5205. Any suitable vector distance measure can be used to find distance between vectors. In one embodiment, the Discrete Cosine Distance is used.

In a large database of vehicles, the likelihood of false matches increase, also the matching process can be expensive. Hence the candidate selector 5205 is used to reduce the candidates for matching.

The candidate selector 5205 picks as input the metadata and plurality of images aaaa and bbbb. It applies a set of rules to reduce the candidates from the database as follows:

When the metadata in yyyy indicates a readable License Plate, pick the candidates having edit distance between candidate LP and event LP within a threshold. For example, if current event is ABC123, and we have 3 candidates, XDGEYD, ABC128 and ADC123, we pick candidates ADC123 and ABC128 as they are only edit distance 1 from ABC123. In other words, strings of characters are compared position by position. If only one character position is different between the two strings, it is classed as edit distance of one. One or more candidate strings having the a range of edit distance are selected.

When metadata in yyyy indicates non-readable License plate, the method uses other textual features in vehicle to narrow down candidate list. This could indicate the vehicle make, stickers inserted on the vehicle. When metadata in yyyy indicates no license plate, the method picks only those candidates from the database that do not have license plate.

FIG. 6 is a block diagram description of an exemplary Cloud Processing Unit (CdPU) 4105 in which components may be circuits or modules of executable instructions for a processor. The CdPU 4105 is communicatively coupled to a User facing application 4106 and to an external Cloud Signature Database Service 4107. The CdPU includes a second Matcher component 6304 which receives input from a second Signature component 6303 and from a second Candidate Selector component 6305. The second Signature component 6303 receives input from a second Image Selector component 6302. Separately, an Image Validator 6306 component of the CdPU receives input from the external User Facing Application component 4106 and transmits to the external Cloud Signature Database Service 4107 which also provides input to the second Candidate Selector component 6305. User location information 4104 is also provided to the second Candidate Selector component 6305. Additionally, the second Candidate Selector component 6305 and the second Image Selector component 6302 receive the output 4109 from the Local Processing Unit 4103.

Figure 7:
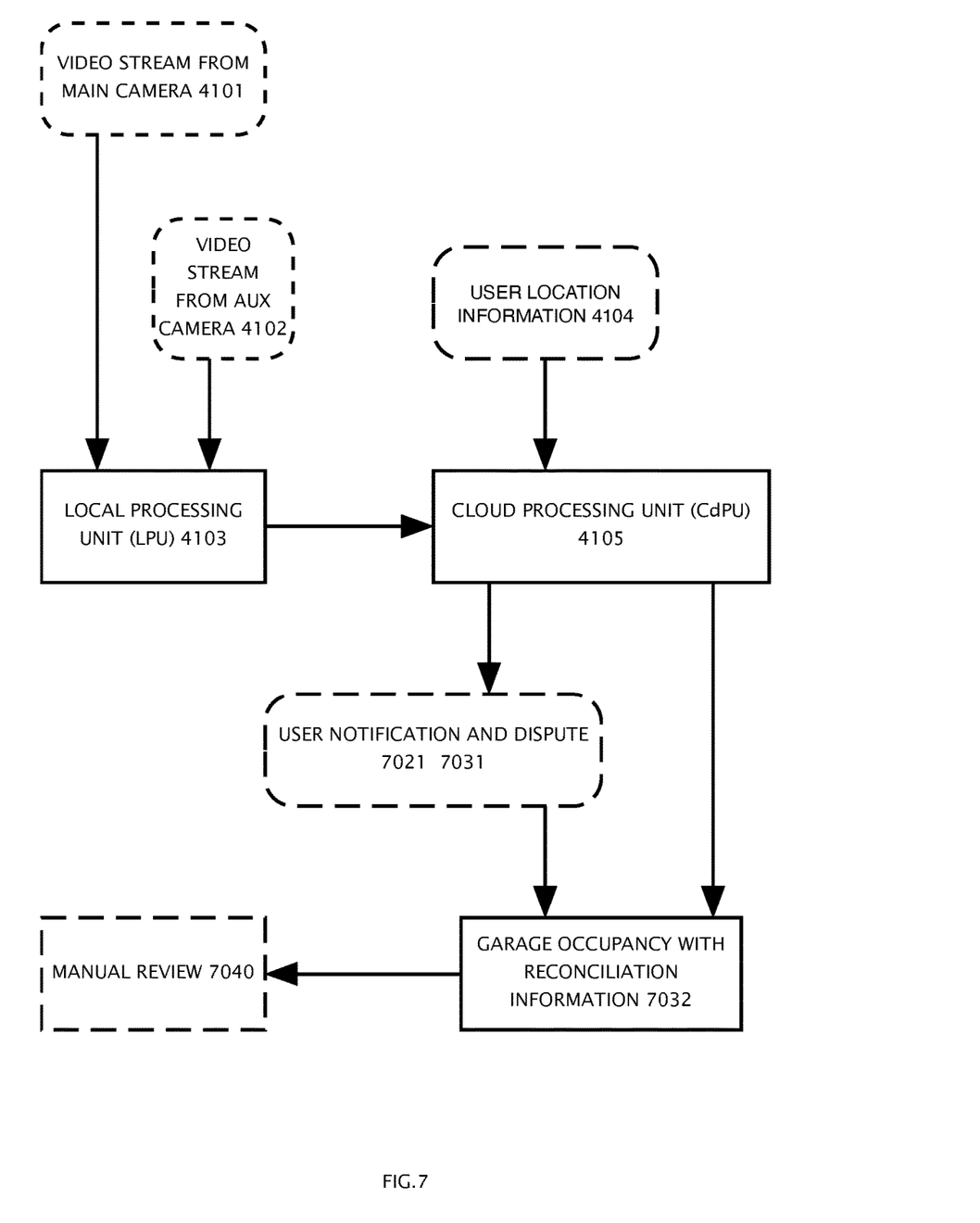
FIG. 7 shows an exemplary overall flow 7000 of interactions, data flows, and events in performing the invention.

Referring to FIG. 7, a Local Processing Unit (LPU) 4103 is Is coupled to a plurality of cameras 4101 4102 to receive in an exemplary embodiment a front camera feed and a rear camera feed. The LPU 4103 provides vehicle signature indicia and optical character recognition of a license plate to a Cloud Processing Unit (CdPU) 4105. In an embodiment, the vehicle may provide a credential or location to the CdPU wirelessly. The CdPU provides a census of garage occupancy with reconciliation information which may be manually reviewed 7040. The CdPU also emits a user notification 7021 which may initiate a user dispute 7031 of the charge, the vehicle, the location, or the date.

One aspect of the invention is a system which includes
a Local Processing Unit (LPU); coupled to
a plurality of cameras to receive a front camera feed and a rear camera feed;
a Cloud Processing Unit (CdPU) coupled to said LPU to receive vehicle signature indicia and optical character recognition of a license plate; whereby the CdPU provides a census of garage occupancy with reconciliation information which may be manually reviewed; whereby the cloud server also emits a user notification which may initiate a user dispute of the charge, the vehicle, the location, or the date.

In an embodiment, the system also includes:
a wireless communication link to obtain vehicle location indicia;
a Cloud Signature Database Service,
a User Facing Application component, and the results of transformations performed in the Local Processing Unit which are the Vehicle event indicia.

In an embodiment, the system also includes:
a Local Signature Database Service which receives updates from the Cloud Signature Database Service; each Signature Database Service is coupled to its respective Processing Unit.

In an embodiment, each local processing unit transmits output to the Cloud Processing Unit, upon each Local Processing Unit receiving a stream of video frame images from a Main Camera and a stream of video frame images from an Aux Camera, said Local Processing Unit including:
a first Image Selector; which receives the stream of video frame image from the Main Camera and the stream of video frame images from the Aux Camera after it has been transformed by, a License Plate Reader (LPR) component;
a first Candidate Selector component also receives the stream of video frame images from the Aux Camera after it has been transformed by the License Plate Reader (LPR) component and input from the external Local Signature Database Service;
a first Signature component transforms the result of the Image Selector component; and provides the resultant Signature indicia to
a first Matcher component which emits a result from the Local Processing Unit;
said first Matcher component receives input from the first Candidate Selector; and also provides its result to the external Local Signature Database Service.

In an embodiment, the cloud processing unit
in which components may be circuits or modules of executable instructions for a processor, cloud processing unit communicatively coupled to a User facing application and to an external Cloud Signature Database Service, said cloud processing unit includes:
a second Matcher component; which receives input from
a second Signature component; and from
a second Candidate Selector component; the second Signature component receives input from
a second Image Selector component; and,
an Image Validator component of the CdPU receives input from the external User Facing Application component and transmits to the external Cloud Signature Database Service which also provides input to the second Candidate Selector component; user location information is also provided to the second Candidate Selector component; wherein the second Candidate Selector component and the second Image Selector component receive the output from the first Matcher component of the Local Processing Unit.

Building on the architecture of the system as disclosed above, one aspect of the invention is a method for tracing a vehicle exiting a restricted access area application as illustrated in the figures which includes having the processes as follows:
recognizing license plate and determining vehicle signature;
determining when License Plate and Entry Database match; when yes,
clearing vehicle from entry Database; and sending a notification; when no,
determining when Global Positioning System Information is present; when yes, obtaining position-time proximal candidates; when no,
obtaining License Plate feature vector and identifying search candidates;
determining a Signature match score among search candidates and proximal candidates;

determining when Best Match score exceeds a Threshold; when no,
requesting a manual action; when yes, sending a notification.

Building on the architecture of the system as disclosed above, another aspect of the invention is a method for tracing a vehicle entering a restricted access area includes the processes as illustrated in the figures as follows:

recognizing license plate and determining vehicle signature 2501;

determining when License Plate and whitelist match, 2510; when yes, onboarding vehicle signature into cloud store 2511; and sending a notification 2551; when no, determining when Global Positioning System Information is present 2520; when yes, obtaining position-time proximal candidates 2521; when no, obtaining License Plate feature vector and identifying search candidates 2530; determining a Signature match score among search candidates and proximal candidates 2540; determining when Best Match score exceeds a Threshold 2550; when no, requesting a manual action 2590; when yes, sending a notification 2551.

Another aspect of the invention is a system having a plurality of illumination emissions whereby at least one of holographic objects are distinguished from planar images; anti-counterfeiting dual color images are distinguished from monochrome images; and whereby patterns encoded by a first polarization are distinguished from patterns encoded by a second polarization. In an embodiment, a first illumination is a first linear polarization and a second illumination is a second linear polarization. In an embodiment, a first illumination has a first angle of incidence and a second illumination has a second angle of illumination to the region of interest. In an embodiment, a first illumination is within a first frequency range and a second illumination is within a second frequency range.

Another aspect of the invention is a system having a plurality of sensors whereby at least one of holographic objects are distinguished from planar images; anti-counterfeiting dual color images are distinguished from monochrome images; and whereby patterns encoded by a first polarization are distinguished from patterns encoded by a second polarization. In an embodiment, said plurality of sensors are at least two cameras having a difference in angle of incidence on a region of interest from a first viewing angle and a second viewing angle.

In an embodiment, said difference between a first viewing angle of a first camera and a second viewing angle of a second camera is greater than 45 degrees. In an embodiment, said difference between a first viewing angle of a first camera and a second viewing angle of a second camera is less than 180 degrees. In an embodiment, said plurality of sensors includes at least one camera with electronically controllable polarization sensitivity. In an embodiment, said at least one camera is electronically switchable among at least a first linear polarization angle and a second polarization angle whereby glare is reduced in at least one image. In an embodiment, said plurality of sensors are at least a first camera having a first frequency range sensitivity and a second camera having a second frequency range sensitivity.

Conclusion

The invention can be easily distinguished from conventional systems by spatial diversity of programmable illuminators and programmable sensors which allow decoding of 3D objects such as holograms and over printed encoded documents. The invention can be easily distinguished from conventional systems by augmenting License Plate information with Vehicle signatures acquired by wider field of view images. The invention is easily distinguished from conventional systems by enhancing the Local Signature Database Services with updates from a Cloud Signature Database Service to overcome low quality of images or vehicle signatures taken locally.

Conventional systems require wireless transponders. Conventional systems include cameras oriented to capture images of the vehicle operator.

The methodologies of embodiments of the disclosure may be particularly well-suited for use in an electronic device or alternative system. Accordingly, embodiments of the present invention may take the form of an entirely hardware embodiment or an embodiment combining software and hardware aspects that may all generally be referred to herein as a "processor," "circuit," "module" or "system."

Furthermore, it should be noted that any of the methods described herein can include an additional step of providing a computer system implementing a method for anomaly alarm consolidation. Further, a computer program product can include a tangible computer-readable recordable storage medium with code adapted to be machine-executed to carry out one or more method steps described herein, including the provision of the system with the distinct software modules. One or more embodiments of the invention, or elements thereof, can be implemented in the form of an apparatus including a memory and at least one processor that is coupled to the memory and operative to perform exemplary method steps.

FIG. 1 depicts a computer system that may be useful in implementing one or more aspects and/or elements of the invention, also representative of a cloud computing node according to an embodiment of the present invention. Referring now to FIG. 1, cloud computing node 110 is only one example of a suitable cloud computing node and is not intended to suggest any limitation as to the scope of use or functionality of embodiments of the invention described herein. Regardless, cloud computing node 110 is capable of being implemented and/or performing any of the functionality set forth hereinabove.

In cloud computing node 110 there is a computer system/server 112, which is operational with numerous other general purpose or special purpose computing system environments or configurations. Examples of well-known computing systems, environments, and/or configurations that may be suitable for use with computer system/server 112 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like exemplary represented as at least one remote computer 144 having memory storage 146 for at least one of data and instructions.

Computer system/server 112 may be described in the general context of computer system executable instructions, such as applications 130 program modules 132, being platformed by a computer operating system 128 and engaged in at least one of receiving, transforming, and transmitting data 134. Generally, program modules 132 may include routines, programs, objects, components, logic, data structures, and so on that perform particular tasks or implement particular abstract data types. Computer system/server 112 may be practiced in distributed cloud computing environments where tasks are performed by remote processing devices that are linked through a communications network. In a distributed cloud computing environment, program modules may be located in both local and remote computer system storage media including memory storage devices 146.

As shown in FIG. 1, computer system/server 112 in cloud computing node 110 is shown in the form of a general-purpose computing device. The components of computer system/server 112 may include, but are not limited to, one or more processors or processing units (processors, cores) 114, a system memory 116, and a bus 118 that couples various system components including system memory 116 to processor 114. Processors, cores, and units may also communication with one another through shared memory service and inter-process communication (IPC) in some embodiments.

Bus 118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 112 typically includes a variety of computer system readable media. Such media may be any available media that is accessible by computer system/server 112, and it includes both volatile and non-volatile media, removable and non-removable media.

System memory 116 can include computer system readable media in the form of volatile memory, such as random access memory (RAM) 120 and/or cache memory as well as non-volatile devices 122 for configuration and initialization (microcode). Computer system/server 112 may further include other removable/non-removable, volatile/non-volatile computer system storage media. By way of example only, storage system can be provided for reading from and writing to a non-removable, non-volatile magnetic or optical media (typically called a "hard drive" or disk storage 124). Such a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 118 by one or more data media interfaces 126. As will be further depicted and described below, memory 116 may include at least one program product having a set (e.g., at least one) of program modules that are configured to carry out the functions of embodiments of the invention.

Application/program/utility 130, having a set (at least one) of program modules 132, may be stored in memory 116 by way of example, and not limitation, as well as an operating system, one or more application programs, other program modules, and program data. Each of the operating system, one or more application programs, other program modules, and program data or some combination thereof, may include an implementation of a networking environment. Program modules 132 generally carry out the functions and/or methodologies of embodiments of the invention as described herein.

Computer system/server 112 may also communicate with one or more external devices. In an embodiment, coupled to the bus 118 are Output Adapters 142, Interface Ports 138, and Communication Connections 150. Input devices 136 such as a keyboard, a pointing device, a touch display, etc. may be coupled to the system via said interface port(s) 138. One or more devices that enable a user to interact with computer system/server 112 or receive the results of performing a method on output devices 140 such as printers, speaker, video displays, projectors, actuators through an output adapter 142. Other systems and networks may be coupled through a communications connection 150 and/or any devices (e.g., network card, modem, etc.) that enable computer system/server 112 to communicate with one or more other computing devices. Such communication can occur via Input/Output (I/O) interfaces 138 142. Still yet, computer system/server 112 can communicate with one or more networks such as a local area network (LAN), a general wide area network (WAN), and/or a public network (e.g., the Internet) via network interface 148. As depicted, network interface communicates with remote computer system/server 144 and may access memory storage 146 at remote computers 144. It should be understood that although not shown, other hardware and/or software components could be used in conjunction with computer system/server 112. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 1, such an implementation might employ, for example, a processor 114, a memory 116, and an input/output interface to output devices 140 (a display and external device(s) such as a keyboard, a pointing device, or the like). The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 120, ROM (read only memory) aka non-volatile 122, a fixed memory device (for example, hard drive 124), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processors, memory, and input/output interface can be interconnected, for example, via bus 118 as part of a data processing unit 112. Suitable communication connections 150, for example via bus 118, can also be provided to a network interface 148, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 114 coupled directly to system memory elements 116 or indirectly through a system bus 118. The memory elements can include volatile memory 120 employed during actual implementation of the program code, bulk storage, and cache memories which provide temporary storage of at least some program code in order to reduce the number of times code must be retrieved from bulk storage during implementation, and non-volatile memory 122 employed to configure and initialize the processing unit during "bootup".

Input/output or I/O devices (including but not limited to keyboards, displays, pointing devices, and the like) can be coupled to the system either directly or through intervening I/O controllers. Network interface(s) 148 may also be coupled to the system to enable the data processing system to become coupled to other data processing systems or remote printers or storage devices through intervening private or public networks. Modems, cable modem and Ethernet cards are just a few of the currently available types of network interfaces.

As used herein, including the claims, a "server" includes a physical data processing system running a server program. It will be understood that such a physical server may or may not include a display and keyboard.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors or processor cores. Further, a computer program product can include a non-transitory computer-readable storage medium with encoded machine executable instructions adapted to be implemented to carry out one or more method steps described herein, including the provision of the system with the distinct software modules.

One example of a user interface that could be employed in some cases is hypertext markup language (HTML) code served out by a server or the like, to a browser of a computing device of a user. The HTML is parsed by the browser on the user's computing device to create a graphical user interface (GUI). Another example of a well-known user interface is HTTP including but not limited to GET, POST, PUT, PATCH, and DELETE, the five most common HTTP methods for retrieving from and sending data to a server.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A system comprising:
    an edge device comprising:
        computer-readable media storing:
            a local signature database service containing a vehicle signature of each vehicle of a census of whitelisted vehicles; and
            a first set of instructions;
        a Local Processing Unit (LPU) communicatively coupled to a plurality of cameras, wherein the LPU executes the first set of instructions to:
            receive a front camera feed and a rear camera feed of a vehicle at a gateway for a restricted access area;
            determine a vehicle signature based on a set of visual features of the vehicle; and
            perform a license plate read (LPR) on the front camera feed and the rear camera feed, wherein
            if the license plate reader reads a license plate correctly, the LPU executes the first set of instructions to:
                add the vehicle signature to the local signature database service if the vehicle is entering the gateway;
                clear the vehicle signature from the local signature database service if the vehicle is exiting the gateway; and
                communicate with a centralized server to synchronize the local signature database service with a centralized signature database service wherein the centralized signature database service stores a plurality of vehicle signatures from a plurality of sites, wherein the LPU transmits event information including one or more images from the front camera feed and the rear camera feed, the LPR and a timestamp; and
            if the license plate reader does not read a license plate correctly, the LPU executes the first set of instructions to communicate, to the centralized server, the one or more images from the front camera feed and the rear camera feed and an indication of a mismatch, wherein the centralized server comprises a Cloud Processing Unit (CdPU) configured to execute a second set of instructions to identify the vehicle based on a vehicle signature stored in the centralized database.

2. The system of claim 1, wherein the CdPU is configured to execute the second set of instructions to identify the vehicle based in part on vehicle location information communicated by a vehicle owner's phone over a wireless communication link.

3. The system of claim 2, wherein the centralized server executes the second set of instructions to:
    communicate with the vehicle owner's phone to receive images of the vehicle from an application executing on the vehicle owner's phone; and
    onboard the images of the vehicle to the centralized signature database service.

4. The system of claim 1, wherein the first set of instructions comprises:
    an Image Selector component executable by the LPU to:
        receive the front camera feed and the rear camera feed; and
        determine a best image of the vehicle from a plurality of images in the front camera feed and the rear camera feed;

a Candidate Selector component executable by the LPU to;
  receive the front camera feed and the rear camera feed;
  communicate with the Local Signature Database Service to select a set of candidate vehicle signatures based on the plurality of images in the front camera feed and the rear camera feed; and
  communicate the set of candidate vehicle signatures to a Matcher component:
a Signature component executable by the LPU to:
  receive the best image received from the Image Selector component; and
  determine signature indicia for the vehicle based on the best image; and
  communicate the resultant signature indicia to the Matcher component, wherein
the Matcher component is configured to:
  receive the list of candidate vehicle signatures from the Candidate Selector component;
  receive the signature indicia from the Signature component;
  determine a vehicle signature matching the vehicle from the set of vehicle signatures; and
  communicate the vehicle signature to the Local Signature Database Service.

* * * * *